Aug. 22, 1967

B. E. WRENSCH 3,337,010

SPRING-APPLIED ELECTROMAGNETICALLY RELEASED BRAKE

Filed May 13, 1965

INVENTOR
BERNARD E. WRENSCH
BY Wheeler, Wheeler + Wheeler
ATTORNEYS

Aug. 22, 1967     B. E. WRENSCH     3,337,010
SPRING-APPLIED ELECTROMAGNETICALLY RELEASED BRAKE
Filed May 13, 1965     2 Sheets-Sheet 2
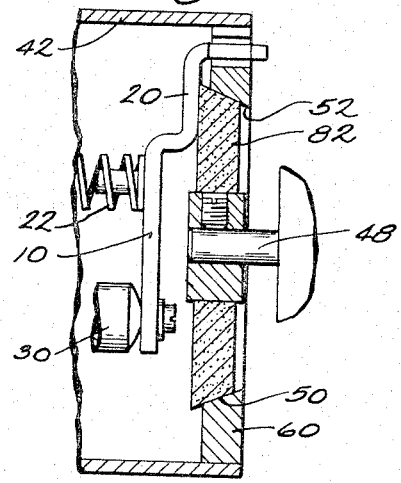
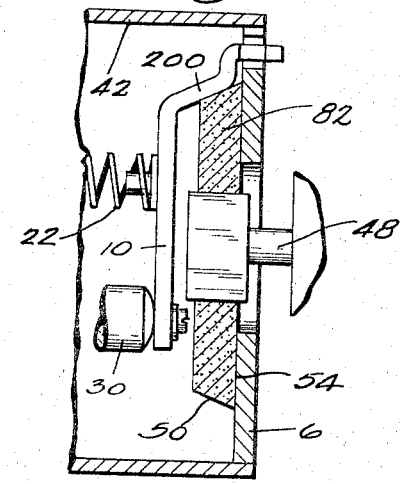
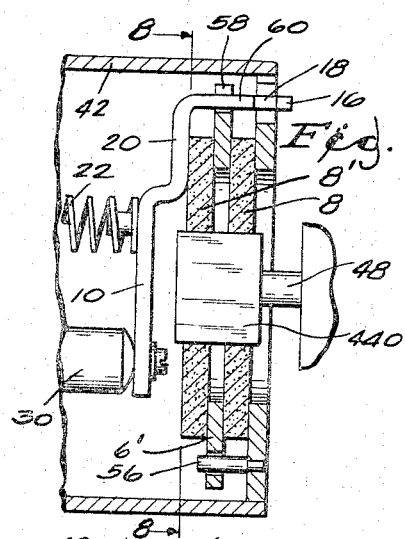
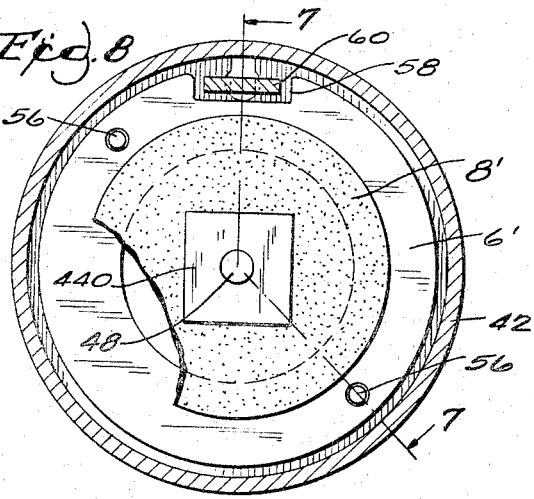
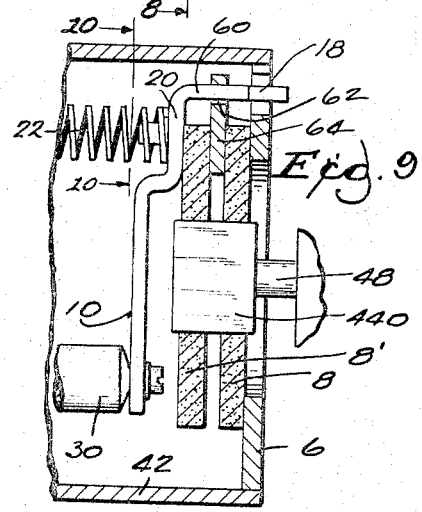
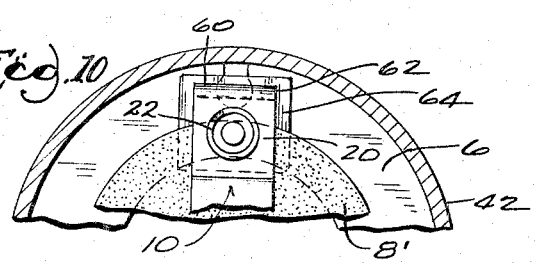
INVENTOR.
BERNARD E. WRENSCH
BY Wheeler, Wheeler & Wheeler
ATTORNEYS

United States Patent Office 3,337,010
Patented Aug. 22, 1967

3,337,010
SPRING-APPLIED ELECTROMAGNETICALLY
RELEASED BRAKE
Bernard E. Wrensch, Brookfield, Wis., assignor to R. H.
Stearns and R. N. Stearns, both of Milwaukee, Wis.
Filed May 13, 1965, Ser. No. 455,379
12 Claims. (Cl. 188—171)

ABSTRACT OF THE DISCLOSURE

A brake disk mounted for rotation has its periphery engaged with pincer action between a stationary brake plate and a lever pivotally connected thereto and extending across the periphery of the brake disk. The lever is spring-biased toward the brake plate to clamp the brake disk. The spring is normally remote from the fulcrum to act on the lever with considerable mechanical advantage. For release of the brake, a solenoid is connected with the lever with greater mechanical advantage than the spring to reduce magnetic action required for spring release. The braking action of the pincer lever and plate may be enhanced by beveling the brake disk periphery to develop a wedging thrust when the disk is clamped between the pincer lever and the plate.

---

This invention relates to a spring-applied electromagnetically released brake.

As applied to a motor, the stationary member of the brake may comprise a plate which, in this embodiment, is fastened to the motor shell and against which a molded disk carried by the motor shaft is spring pressed when the solenoid that disengages the brake is de-energized consequent upon the de-energization of the motor. The solenoid and the spring both act upon a lever arm which is pivoted to the stationary brake member and acts with considerable leverage to pinch the molded disk or effect its release. The spring has considerable leverage but the solenoid acts with even more leverage on an extremity of the lever which is much farther from the pressure point than is the spring.

FIG. 5 illustrates in fragmentary section a modified embodiment of the invention wherein the pincer or caliper action is supplemented by a wedging or cone clutch action brought about by tapering conically the peripheral portion of the disk on which the caliper lever operates and by providing a complementary conically tapered surface on the stationary disk with which the rotating disk coacts under pressure.

FIG. 6 shows an arrangement somewhat similar to that of FIG. 5 but the converse thereof in that the rotating disk has a conically tapered periphery with which a complementary portion of the caliper lever interacts, the back face of the rotating disk being urged into face contact with the stationary disk of the brake.

FIG. 7 discloses fragmentarily in section a further modified embodiment in which there are a plurality of rotating disks and a plurality of stationary disks which are interleaved, FIG. 7 being taken in section on the line 7—7 of FIG. 8.

FIG. 8 shows the embodiment of FIG. 7 as viewed in section on the line 8—8 of FIG. 7, portions being broken away.

FIG. 9 is a further modified embodiment which, like FIGS. 5 and 7, is taken in section axially of the rotor.

FIG. 10 is a view taken in section on the line 10—10 of FIG. 9.

Figure 1:
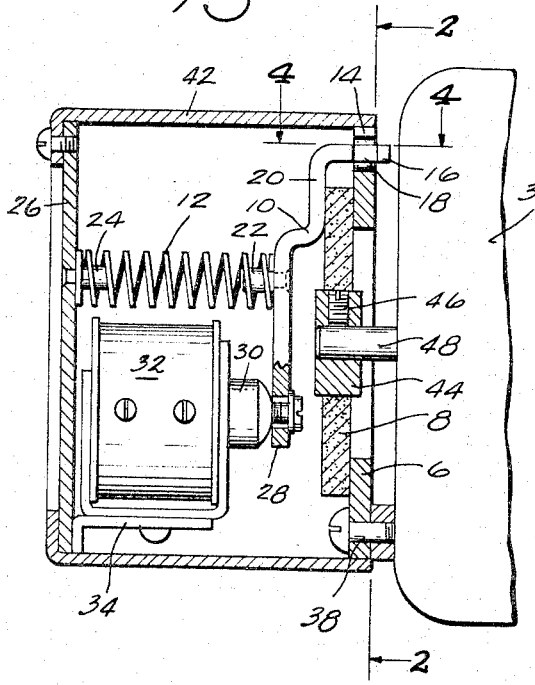
FIG. 1 is a view in longitudinal section on the line 1—1 of FIG. 2 through a brake embodying the invention, the motor shell being fragmentarily illustrated.
Figure 2:
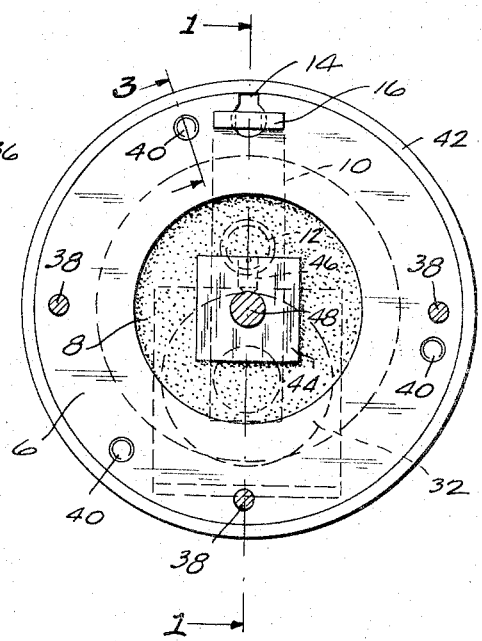
FIG. 2 is a view in end elevation of the brake shown in FIG. 1.
Figure 3:
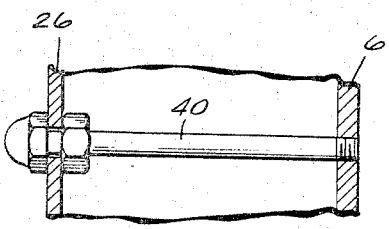
FIG. 3 is a fragmentary detail view taken in section on the line 3—3 of FIG. 2.
Figure 4:
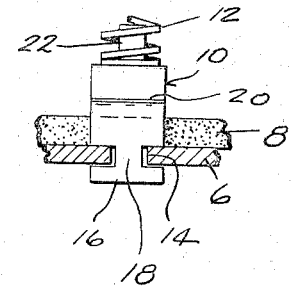
FIG. 4 is a fragmentary detail view taken in section on the line 4—4 of FIG. 1.

The brake comprises a stationary plate 6 against which the molded disk 8 can be pressed by the pincer or "caliper" action of a lever 10 subject to the bias of spring 12. The plate has a keyhole slot at 14 with a minimum width equal to the thickness of the metal from which lever 10 is formed. The lever may have a head portion 16 which, in the assembled portion of the parts, is engaged behind the plate 6. A shank portion 18 extends through the slot 14 and is connected to the portion 20 of lever 10 which frictionally engages the disk 8 as shown in FIG. 1.

A stud 22 may be used to position the end of the spring 12 that seats on the lever. A similar stud 24 on the housing end wall 26 positions the other end of spring 12 to provide a fixed seat therefor.

The lever is pivotally movable on its loose connection with mounting plate 6 as above described. At its free end 28 the lever is connected with the armature 30 of a solenoid 32 which is carried on bracket 34 from end wall 26 and which, in practice, would normally be connected with the electric motor either in series or parallel, to be energized whenever the motor is energized.

In most of the views, the spring is disposed about midway between the solenoid and the point of engagement of the caliper lever with the clutch disk. However, the location of the spring may be varied. In FIG. 9, for example, it is shown in a position in which the thrust of the spring is communicated directly through the lever against the clutch disk or disks. This change may be made in any of the other embodiments shown, or the spring may be located elsewhere. If the spring thrust is exerted as shown in FIG. 9, it is unnecessary that the lever be headed behind the plate 6.

The motor is here shown only by the fragmentary illustration at 36 of a portion of the motor shell to which the mounting plate 6 of the brake is secured, as by screws or bolts 38. The rods 40 are shown to exemplify a means of connecting the wall 26 with the mounting plate 6. If desired, the mechanism may be enclosed by a generally cylindrical casing 42.

The molded disk 8 is mounted on a non-circular hub 44 which, as here shown, is square and held by a set screw 46 to the motor shaft 48. Disk 8 is slidable on this hub axially of the shaft but the shaft and hub are secured together for concurrent rotation or cessation of rotative movement.

The spring 12 acting on lever 10 normally causes the portion 20 of the lever to engage a portion of disk 8 near the periphery thereof to clamp the disk against plate 6. The action has been described as a pincer or caliper action. Inasmuch as the spring engages the lever 10 at a point which is farther from the fulcrum than the point where the braking action occurs, the spring has considerable mechanical advantage. The solenoid 32 can be extremely light because it has even greater mechanical advantage and requires very little power to retract the lever 10 against the bias of spring 12 to release the disk 8 for accommodating armature shaft rotation. As soon as the motor is de-energized, the solenoid 32 is also de-energized and the spring thereupon applies the brake to disk 8 to arrest movement of the rotor shaft.

In the construction of FIG. 5, the arrangement is generally similar to that of FIG. 1. The rotor shaft 48, solenoid armature 30, compression spring 22, caliper lever 10 and housing 42 are all essentially the same as previously described. The portion 20 of the caliper lever acts by engaging externally the outer face of the disk 82 on shaft 48. This disk, however, instead of having face contact with the stationary disk 60, operates like a cone clutch, having a conically tapering periphery 50 which, under the spring-induced caliper thrust of lever 10, is forced into the complementary conically tapered braking surface 52 of the stationary disk 60. Thus, the caliper action is supplemented by the cone clutch action between the parts 82 and 60.

In the construction shown in FIG. 6, the rotor disk 82 has its conical surface 50 reversed from that shown in FIG. 5 to be acted on by a complementary portion 200 of the lever 10. Here the cone clutch effect is developed between the caliper lever 10 and the rotor disk 82, a portion of the back face 54 of the rotor 82 coacting with the stationary disk 6 in the same manner as in the FIG. 1 construction.

It will, of course, be understood that in any use of a brake or clutch disk of conical section as shown either in FIG. 5 or FIG. 6, or related designs, it is important to successful operation that the angle of the conical surface must be carefully selected to give the relatively high torque expected of a cone clutch or brake without permitting the unit to become permanently locked as will be the result if the angle is too shallow. An advantage in the use of a cone brake at this point lies in the fact that little or no axial loading is placed on the shaft which is subject to the braking action. In the construction shown in FIG. 6, there will be a slight downward thrust on the shaft. However, in many installations, the simplicity of this design may make it preferable to the construction of FIG. 5 notwithstanding the resultant downward thrust in the construction of FIG. 6.

In the construction shown in FIG. 7, multiple disks are used. The hub 440 may be identical with that already disclosed except that it has greater extent axially of shaft 48 to carry a plurality of disks respectively designated 8 and 8′. The disk 8′ is directly engaged by the portion 20 of the caliper lever 10 while the disk 8 is engaged with the stationary disk 6 exactly as in FIG. 1. Between the two disks 8 and 8′, there is interleaved another stationary disk 6′ so that the caliper lever in this embodiment develops friction between the two rotating disks 8 and 8′ respectively and the two stationary disks 6 and 6′ respectively. The disk 6′ and any additional disks of like nature will be secured against rotation by torque absorbing pins 56 and may be notched at 58 to pass the portion 60 of caliper lever 10.

If desired, the pins 56 may be omitted and the disk 6′ may be replaced by a small plate 64 having an aperture 62 which fits snugly onto the portion 60 of the caliper lever 10 to be held thereby against rotation. In this device only the plate is now interposed between those portions of the rotating disks 8′ and 8 which are subject to the pressure of portion 20 of the caliper lever 10. Since this pressure is limited to a small portion of the periphery of the respective disks 8 and 8′, it is not necessary to provide the intervening stationary "disk" 64 with angular extent appreciably greater than that shown in FIG. 9 and FIG. 10.

It will, of course, be understood that any number of rotatable and stationary disks may be used within the contemplation of the present invention and the compression spring 22 may also be moved to various positions other than that shown in FIGS. 1 to 8. In some respects there are advantages in locating the spring in the position shown in FIGS. 9 and 10 where its thrust is transmitted through the flat portion 20 of the caliper lever 60 directly against the disk or disks. The device responds to the solenoid in the same way but the caliper lever 10 may be somewhat simpler since it does not require any head 16.

It will be understood that for other purposes other mounting arrangements can be used. Many other details given are by way of example rather than by way of limitation.

I claim:
1. In a device for frictionally engaging one plate with a complementary plate, at least one of which is fixed and another is mounted on a shaft for rotation, the combination with one plate, of a lever having a loose fulcrum connection with the one plate and having a portion in spaced relation thereto, a peripheral portion of the other plate being interposed between said portion and said one plate whereby the said lever portion may act with pincer action thereon, means connected with said lever at a point remote from the said fulcrum connection of said lever and movable in a direction to release the pincer action of the lever on said other plate, a spring located between last mentioned means and the fulcrum of said lever and having respectively a fixed seat and a seat upon the lever, said spring biasing said lever to effect pincer action thereof to press the one plate against the peripheral portion of the other plate.

2. A combination according to claim 1 in which the loose fulcrum connetcion between the lever and the one plate comprises a shank and head upon the lever, the head engaging the one plate at the side thereof opposite said lever portion and the one plate having a slot through which said shank extends.

3. A shaft brake comprising the combination with a mounting plate constituting a fixed plate of the brake and provided near its periphery with a slot, a shaft hub in a plane adjacent a face of the plate, a disk mounted on the hub and having a peripheral portion adapted for face contact with said plate, a lever for clamping the said peripheral portion of the disk to the said face of the plate with pincer action, said lever having a fulcrumed connection with said plate which includes a shank of the lever extending through the slot of the plate and a head carried by the shank and engaging the plate at the side thereof opposite the face engaged by said disk, said lever extending centrally past the said peripheral portion of the disk and having a free end portion beyond an intermediate portion of the lever which is engageable externally with said disk in a direction to force it against said plate, a wall spaced from the disk and provided with a bracket, a solenoid mounted on the bracket and having an armature connected with the free end of the lever, and a compression spring confined between said wall and a portion of the lever and biasing said lever in a direction to effect the clamping of the said peripheral portion of the disk against the plate to arrest shaft rotation, said solenoid being adapted when energized to effect movement of the free end of the lever against the bias of said spring to release the clamping action of said lever upon the disk, whereby to accommodate shaft rotation.

4. A combination according to claim 3 in which means is provided for supporting said wall from said plate, and a casing which encloses the wall and plate marginally to house the solenoid, the spring, the lever and the disk.

5. In a combination pincer and cone brake, the combination with relatively fixed and rotatable brake disk parts and a caliper lever part in pivotal connection with the fixed brake part and movable to and from engagement with the rotatable disk part, the caliper lever part and the fixed brake disk part having opposing portions between which the rotatable disk part is clamped when so engaged, the rotatable disk part having a conically tapered peripheral portion and one of said other parts having a portion of complementary angle, the said tapered and angled portions being in operative frictional engagement during the functioning of said brake, engagement of said tapered portions resulting in a substantial radial component of thrust on the rotatable disk part in the direction of its axis, axial thrust on said disk part being balanced between the fixed disk part and the caliper lever part.

6. A brake according to claim 5 in which the periphery of the rotatable disk tapers toward the relatively fixed disk, the latter having the surface of complementary angle with which the relatively rotatable disk coacts.

7. A brake according to claim 5 in which the relatively rotatable brake disk has its periphery tapered away from the relatively fixed disk and the caliper lever part has the surface of complementary angle engageable with the periphery of the relatively rotatable disk.

8. A multiple disk caliper brake comprising the combination with a plurality of relatively rotatable disk parts and a plurality of relatively non-rotatable disk parts, of a caliper lever having a fulcrum portion in loose pivotal connection adjacent the periphery of a rotatable part with one of said relatively non-rotatable parts and extending across the periphery of said rotatable part and past the other of said relatively non-rotatable parts and provided with a portion extending inwardly and engaged with a face portion adjacent the periphery of another of the relatively rotatable parts, the relatively rotatable parts having the last mentioned relatively non-rotatable part interleaved between them.

9. A brake according to claim 8 in which the relatively non-rotatable part beyond which the caliper lever extends from its fulcrum portion has torque absorbing means exclusive of the caliper lever for connecting it with the relatively fixed disk with which the caliper lever is in pivotal connection.

10. A brake according to claim 8 in which the relatively non-rotatable part beyond which the caliper lever extends from its fulcrum connection is a plate dependent on the caliper lever for position and having an opening through which the caliper lever extends, said plate having a total radial extent which is less than the radius of the relatively rotatable disk parts and being confined between outer peripheral portions of the latter.

11. In a device for frictionally engaging one plate with a complementary plate, at least one of which is fixed and another is mounted on a shaft for rotation, the combination with one plate, of a lever having a loose fulcrum connection with the one plate and having a portion in spaced relation thereto, a peripheral portion of the other plate being interposed between said portion and said one plate whereby the said lever portion may act with pincer action thereon, means connected with said lever at a point remote from the said fulcrum connection of said lever and movable in a direction to release the pincer action of the lever on said other plate, a spring located between the last mentioned means and the fulcrum of said lever and having respectively a fixed seat and a seat upon the lever, said spring biasing said lever to effect pincer action thereof to press the one plate against the peripheral portion of the other plate, the means movable to release the pincer action of the lever on said other plate being an armature having an actuating electromagnet.

12. A device according to claim 11 in which the spring is disposed in close proximity to the loose fulcrum connection between the lever and said one plate, the spring acting on the lever substantially at the point of, and in alignment with the direction of, engagement of the lever with the other said plate.

References Cited
UNITED STATES PATENTS 2,211,077   8/1940   Schlums.
3,207,267   9/1965   Beuchle et al. _____ 188—73

DUANE A. REGER, *Primary Examiner.*